T. H. KRITZER.
GASOLENE GAGE.
APPLICATION FILED AUG. 19, 1914.

1,233,065.

Patented July 10, 1917.

Inventor
T. H. Kritzer

Witnesses
Robert M. Sutphen
A. I. Hind

By Watson E. Coleman
Attorney

UNITED STATES PATENT OFFICE.

THOMAS H. KRITZER, OF SPENCER, NORTH CAROLINA.

GASOLENE-GAGE.

1,233,065.

Specification of Letters Patent.

Patented July 10, 1917.

Application filed August 19, 1914. Serial No. 857,564.

*To all whom it may concern:*

Be it known that THOMAS H. KRITZER, a citizen of the United States, residing at Spencer, in the county of Rowan and State of North Carolina, has invented certain new and useful Improvements in Gasolene-Gages, of which the following is a specification, reference being had to the accompanying drawings.

My invention relates to certain new and useful improvements in gasolene gages for use principally in connection with gasolene tanks on automobiles and has for its object the production of a gage and connections which shall be of simple construction and which may be readily applied to the gasolene tank.

With these ends in view my invention consists in the details of construction and arrangement hereinafter fully set forth.

In order that those skilled in the art to which my invention appertains may know how to make and apply my improved gage, I will now proceed to describe the same referring by numerals to the accompanying drawing in which—

Figure 1:
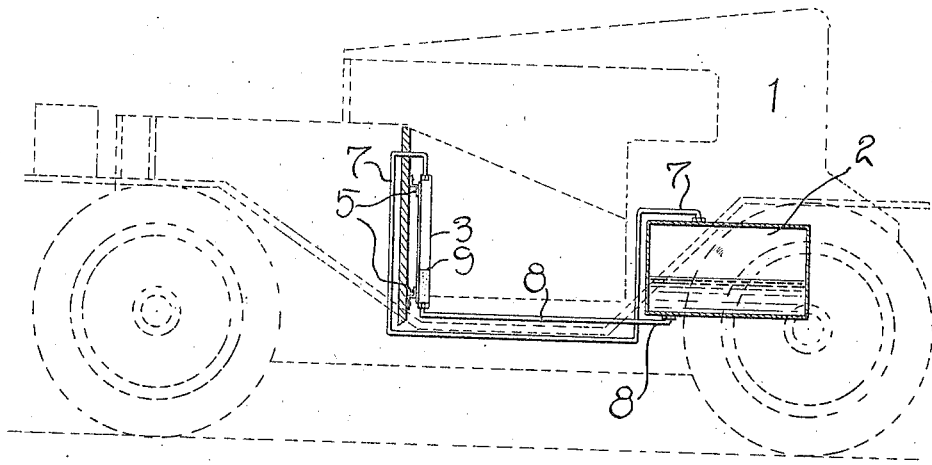
Figure 2:
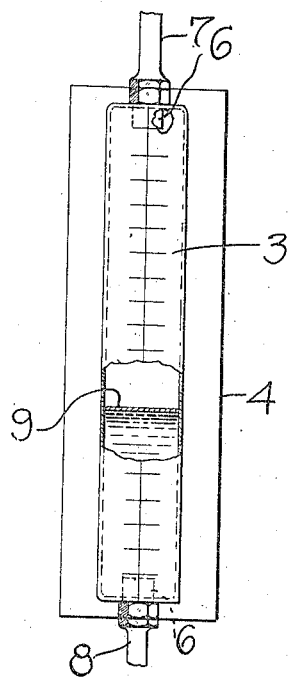

Figure 1 is side elevation partly in section, of an automobile equipped with a gasolene tank and my improved gage connections and Fig. 2 is a front view on enlarged scale, of the sight glass.

Similar reference numerals indicate like parts in both figures of the drawing. 1 represents an ordinary automobile having a gasolene tank 2 secured thereto at any convenient locality. 3 is a tubular or other hollow gage or sight glass secured in a metal frame 4 which is connected by suitable brackets 5, to the dash of the vehicle. The sight glass is provided at both the upper and lower extremities with screw threaded nipples 6 for connection to copper pipes 7 and 8 one of which 7. is connected to the top of the glass 3 and with the top of the tank 2, while the other 8 is secured to the bottom of the glass and the bottom of the tank as clearly shown in Fig. 1. The glass is provided with graduations adapted and designed to indicate the quantity or fluid level of the gasolene in the tank, and is furnished with an interior thin disk 9 of cork adapted to float upon the fluid level of the gasolene delivered to the glass by the pipe 8, while the pipe 7 which connects the top of the tank with the top of the gage or sight glass, establishes an equilibrium of gas pressure in the tank and the glass and thus secures an exact and correct indication as to the height and quantity of gasolene in the tank. By the provision of the thin float disk, the same may readily assume various obliquely inclined positions with respect to the axis of the gage tube when the tube is disposed in obliquely inclined positions with respect to a horizontal plane as, for instance, when the vehicle is ascending or descending an inclined grade. In other words, the float disk will at all times remain in a horizontal position within the tube, irrespective of the degree of inclination of the latter. Thus, an inaccurate indication of the quantity of fuel in the tank will be obviated. The tubes 7 and 8 are connected with the top and bottom of the gasolene tank and the top and bottom of the glass gage by any well known or desired couplings and while I have shown the metallic frame of the glass secured by brackets to the dash, it may be secured in any other desired manner and at any preferred locality.

From the construction shown and described it will readily be understood that the gasolene within the tank seeking its level through the tube 8 will rise in the sight glass and lift the thin cork disk 9, which being readily visible through the glass will indicate clearly the quantity or height of gasolene in the tank.

What I claim as new and desire to secure by Letters Patent is:—

A gasolene gage for motor vehicles including a graduated sight glass connected with the fuel supply tank and mounted in a vertical position upon the dashboard of the vehicle, and a thin flat, buoyant disk movable in said sight glass in the rise and fall of the liquid and capable of assuming various obliquely inclined positions with respect to the longitudinal axis of the sight glass when the vehicle ascends or descends an incline, whereby said disk will at all times remain in a horizontal plane within the sight glass.

In testimony whereof I hereunto affix my signature in the presence of two witnesses.

THOMAS H. KRITZER.

Witnesses:
C. S. BEAM,
J. K. DORSETT.